United States Patent [19]
Gray et al.

[11] Patent Number: 5,248,715
[45] Date of Patent: Sep. 28, 1993

[54] SELF-ADHERING SILICONE RUBBER WITH LOW COMPRESSION SET

[75] Inventors: Thomas E. Gray; Michael E. Kunselman; Richard A. Palmer; William J. Schulz, Jr., all of Midland, Mich.

[73] Assignee: Dow Corning Corporation, Midland, Mich.

[21] Appl. No.: 921,783

[22] Filed: Jul. 30, 1992

[51] Int. Cl.$^5$ .............................................. C08K 5/24
[52] U.S. Cl. ................................... 524/265; 524/301; 524/398; 524/730; 524/773; 524/783; 524/786; 528/15; 528/16
[58] Field of Search ............... 524/786, 773, 730, 783, 524/265, 301, 398; 528/15, 16

[56] References Cited

U.S. PATENT DOCUMENTS

| | | |
|---|---|---|
| 3,527,655 | 9/1970 | Ballard . |
| 3,794,556 | 2/1974 | Young . |
| 3,892,707 | 7/1975 | Itoh et al. . |
| 3,960,800 | 6/1976 | Kohl, Jr. . |
| 4,082,726 | 4/1978 | Mine et al. . |
| 4,087,585 | 5/1978 | Schulz . |
| 4,163,081 | 7/1979 | Schulz . |
| 4,245,079 | 1/1981 | Matsumoto et al. . |
| 4,311,739 | 1/1982 | Hardman et al. . |
| 4,737,562 | 4/1988 | Chaudhury et al. . |
| 4,753,978 | 6/1988 | Jensen . |
| 4,946,878 | 8/1990 | Jensen et al. . |
| 5,006,580 | 4/1991 | Kasuya et al. . |
| 5,023,288 | 6/1991 | Hirai et al. . |
| 5,082,894 | 1/1992 | Vanwert et al. . |
| 5,110,845 | 5/1992 | Gray et al. . |

FOREIGN PATENT DOCUMENTS

| | | |
|---|---|---|
| 384352 | 8/1990 | European Pat. Off. . |
| 101146 | 6/1985 | Japan . |

OTHER PUBLICATIONS

Abstract For JP 60-101146, Jun. 1985.

*Primary Examiner*—Melvyn I. Marquis
*Attorney, Agent, or Firm*—James E. Bittell

[57] ABSTRACT

Liquid silicone compositions are described that cure to rubber which exhibits a unique combination of properties including low compression set and unprimed adhesion to a variety of substrates. The compositions include silicone polymers curable by hydrosilation reaction and specific combinations of adhesion promoting materials. Compositions containing aluminum chelates and epoxytrialkoxysilanes have been found particularly useful when adhesion to metal substrates is desired. When the compositions are desired to adhere to plastic materials, it is advantageous to include along with the aluminum chelate and epoxytrialkoxysilane, a tetraalkyltitanate, an alkylpolysilicate, and an acrylate or methacrylate compound.

20 Claims, No Drawings

1

SELF-ADHERING SILICONE RUBBER WITH LOW COMPRESSION SET

BACKGROUND OF THE INVENTION

Field of the Invention

This invention relates to liquid silicone compositions curable to rubber. The cured silicone rubber provides a unique combination of properties including low compression set and unprimed adhesion to a variety of substrates.

Liquid silicone compositions curable to rubber based upon vinyl-containing polydiorganosiloxane polymer, organohydrogensiloxanes containing hydrogen on silicon groups, and platinum group containing catalyst are well known in the art of silicone elastomer compositions. Such compositions are also well known for their reluctance to adhere to substrates against which the composition is cured. Many additives have been developed in attempting to obtain good adhesion of such compositions to substrates. When these additives are used to obtain adhesion, the compression set of the composition increases to an unacceptable level for applications such as gaskets which need to have a relatively low compression set in order to function properly.

U.S. Pat. No. 3,527,655, issued Sep. 8, 1970, teaches a fluid, curable silicone elastomer composition which bonds tightly to surfaces contacting it during cure comprising a vinyl-substituted polysiloxane, an organohydrogen polysiloxane, a platinum compound catalyst, and a cohydrolyzate of vinyl trichlorosilane and vinyltriethoxysilane.

Use of a primer composition rather than an additive is taught in U.S. Pat. No. 3,794,556, issued Feb. 26, 1974. The primer is a mixture of an alkoxy silicon compound, titanate, and an organosilicon compound having trifluoropropyl radicals and hydrogen or triacetoxy radicals. Use of a primer causes at least a two-step process in bonding the silicone rubber to a substrate.

U.S. Pat. No. 3,892,707, issued Jul. 1, 1975, teaches a composition comprising a diorganovinylsilyl-terminated diorganopolysiloxane, an alkenyl isopropenoxysilane, an organohydrogenpolysiloxane, and platinum compound catalyst which gives strong bonding to the surface of a substrate to which it is in contact. There is no indication as to the compression set of the material.

U.S. Pat. No. 3,960,800, issued Jun. 1, 1976, teaches a reaction product prepared by mixing an organosiloxane and an acetoxysilicon compound under anhydrous conditions, either one or both of which has a silicon-bonded vinyl radical. This reaction product when mixed with an alkyl silicate, an organotitanate, and organic solvent forms a primer solution for use on substrates to which silicone elastomers are to be applied.

A curable organopolysiloxane composition which is self-adhering is taught in U.S. Pat. No. 4,082,726, issued Apr. 4, 1978. The adhesion additive is an organosilicon compound having at least one silicon group having attached to the silicon atom one monovalent hydrocarbon group containing at least one epoxy group and two alkoxy groups and at least one lower alkenyl group or hydrogen atom bonded to silicone atoms which are in the same molecule.

A self-adhering composition is taught in U.S. Pat. No. 4,087,585, issued May 2, 1978, wherein the additional ingredients to provide adhesion are a polysiloxane having at least one silicon-bonded vinyl radical and at least one silicon-bonded hydroxyl radical, and an epoxy-containing, alkoxy silane.

U.S. Pat. No. 4,163,081, issued Jul. 31, 1979, teaches use of a vinyl-containing amidosiloxane to give improved adhesion to many substrates.

A composition having improved adhesion is taught in U.S. Pat. No. 4,245,079, issued Jan. 13, 1981. The composition comprises an organopolysiloxane having at least two alkenyl groups bonded to silicon atoms in which the silicon atom is attached to a monovalent hydrocarbon group containing a trialkoxysilyl group, an epoxy group or an ester group, an organohydrogenpolysiloxane and a platinum catalyst. A self-bonding silicone rubber composition comprising a vinyl-terminated polysiloxane polymer, a hydride siloxane crosslinking agent, a platinum catalyst and as the self-bonding additive, the partial hydrolysis product of an aliphatically unsaturated hydrolyzable alkoxy silane is claimed in U.S. Pat. No. 4,311,739, issued Jan. 19, 1982.

An adhesion promoter which is useful in platinum-catalyzed hydrosilation reaction cured polyorganosiloxane compositions is taught in U.S. Pat. No. 4,737,562, issued Apr. 12, 1988. The adhesion promoter is a combination of 1,2-bis(trialkoxysilyl) ethane, an organosilicon compound containing at least one hydroxyl group or hydrolyzable precursor and at least one group that reacts at ambient temperature with the alkoxy groups of the silylethane, and a catalyst for the reaction of the adhesion promoter ingredients.

U.S. Pat. No. 4,946,878, issued Aug. 7, 1990, teaches the use of a mixture of diorganoalkenylsiloxy-terminated polydiorganosiloxanes where the alkenyl radical in one of the diorganosiloxanes is a radical which is terminally unsaturated and contains at least 4 carbon atoms to give a faster cure rate than when the radical is a vinyl radical.

European Patent Application 384352, published Aug. 29, 1990, teaches an adhesive promoter comprising either a mixture or reaction product of a carboxylic acid ester containing an acryloxyloxy or methacryloxyloxy group and a hydroxyalkyl group and an organosilicon containing silicon-bonded vinyloxy or a substituted vinyloxy group.

A self-bonding composition is taught in U.S. Pat. No. 5,006,580, issued Apr. 9, 1991, in which the additives are a carbonyl complex of a Group VIB element and a compound containing a silicon-bonded alkoxy group which is selected from the group consisting of silanes or siloxane oligomers.

A silicone rubber adhesive described in U.S. Pat. No. 5,023,288, issued Jun. 11, 1991, contains wet-method hydrophobicized reinforcing silica, acryl-functional silane coupling agent or methacryl-functional silane coupling agent, epoxy-functional coupling agent, and partial allyl ether of a multivalent alcohol as the adhesion producing ingredients.

A self-bonding elastomer in a one-part organosiloxane composition which cures by a platinum-catalyzed hydrosilation reaction is taught in U.S. Pat. No. 5,082,894, issued Jan. 21, 1992. Long time storage stability, short cure time, and cohesive bonding to a variety of substrates are achieved by including an acetylenic alcohol, an alkoxysilane containing an epoxy group, and a polyorganosiloxane containing an average of at least one silicon-bonded hydroxyl group and at least one silicon-bonded vinyl radical per molecule.

U.S. Pat. No. 5,110,845, issued May 5, 1992, teaches use of calcium hydroxide in order to reduce compression set.

One of the methods of sealing valve covers, rocker covers, oil pans, and such in automotive engines is through the use of cured-in-place gaskets. These gaskets are produced by extruding a bead of sealant material onto the part to be used and curing the material in place. The material must bond to the substrate. Because the part is then clamped onto the engine block, the sealant material must have a low compression set because the purpose of the gasket is to prevent leaks at the joint formed between the part and the engine. The composition used as the sealant material must be heat stable, have good compression set when cured, and adhere to the substrate to which it is applied.

SUMMARY OF THE INVENTION

A liquid silicone rubber composition comprising an alkenyl-containing polydiorganosiloxane, an organohydrogensiloxane having at least 3 silicon-bonded hydrogen atoms per molecule, filler, platinum-group containing catalyst, and specified amounts of aluminum chelate, and epoxytrialkoxysilane can be used for cured-in-place gasketing material for metal substrates when the ratio of hydrogen on silicon in the organohydrogensiloxane to the alkenyl on silicon in the polydiorganosiloxane is from 1.2 to 1.9. The composition can be used on plastic substrates by the addition of specified amounts of tetraalkyltitanate, alkylpolysilicate, and a methacrylate or acrylate compound.

DESCRIPTION OF THE INVENTION

This invention relates broadly to a liquid silicone compositions curable to rubber comprising an alkenyl-containing polydiorganosiloxane, having an average ratio of organo radicals per silicon atom within a range greater than 2 up to and including 2.03, and each organo radical of the polydiorganosiloxane being a monovalent radical selected from the group consisting of hydrocarbon radicals and fluorinated alkyl radicals both having less than 7 carbon atoms per radical, an organohydrogensiloxane having an average of at least 3 silicon-bonded hydrogen atoms per organohydrogensiloxane molecule and valences of any silicon atom in the organohydrogensiloxane not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organohydrogensiloxane having no more than one silicon-bonded hydrogen atom on any one silicon atom, the amount of organohydrogensiloxane providing a ratio of silicon-bonded hydrogen atoms to alkenyl groups from the polydiorganosiloxane of 1.2 to 1.9, filler, and a hydrosilation catalyst containing a metal of the platinum group, an aluminum chelate in an amount to provide 0.05 to 20 ppm aluminum based on the polydiorganosiloxane, and 0.05 to 0.40 parts epoxytrialkoxysilane per 100 parts polydiorganosiloxane where the alkoxy radicals of the epoxytrialkoxysilane have 1 to 4 carbon atoms.

The invention also relates to the composition as described above further containing a tetraalkyltitanate in an amount to provide 1 to 100 ppm titanium based on the polydiorganosiloxane where the alkyl radicals of the tetraalkyltitanate have 1 to 20 carbon atoms, from 0.1 to 10 parts alkylpolysilicate per 100 parts polydiorganosiloxane where the alkyl radicals of the alkoxypolysilicate have 1 to 4 carbon atoms, and from 0.1 to 2.0 parts of an acrylate or methacrylate compound per 100 parts polydiorganosiloxane.

Cured-in-place gaskets are dispensed on a substrate while uncured, then are cured in place. They are required to adhere to the substrate, which may be a metal, a coated metal, or a plastic so that the part can be stored and then installed without the gasket becoming displaced. Since the gaskets are used to seal the joint between the substrate and the part to which it is being attached, the gasket needs to have low compression set so that the joint will remain sealed upon aging and upon exposure to any gas or liquid which may be in contact with the joint. A common use for such gaskets is on oil pans and timing belt covers on automobile engines.

A number of materials have been added to various other types of silicone compositions to improve the adhesion of the compositions to substrates. However, when such materials were added to typical silicone compositions as used for gaskets, the compression set of the rubber formed from the compositions was increased to an unacceptable level. A compression set of 35 percent after testing at 177° C. for 22 hours is a maximum acceptable result. Users prefer a maximum compression set under such conditions of about 28 percent. Reduction of compression set from 35 percent to 28 percent is a major change in the current state of the art.

Extensive investigation has discovered that certain combinations of additives in defined amounts can be added to silicone compositions adapted for gasket use to produce new compositions which have adhesion to the substrate upon which the composition is cured while retaining the compression set at acceptable low levels. In silicone compositions curable by the hydrosilation reaction, the ratio of hydrogen on silicon to alkenyl on silicon is also adjusted within certain limits to accommodate the adhesion additives and produce the unique combination of adhesion and low compression set in the cured rubber.

The linear polymer component of the composition is one or more polydiorganosiloxanes-containing alkenyl groups such as vinyl and/or hexenyl groups. In order for the polymer to properly crosslink, at least 2 alkenyl groups per molecule are needed. Generally the polydiorganosiloxane is diorganoalkenylsiloxy terminated with the alkenyl group being a vinyl group. The alkenyl radical contains at least two carbon atoms and can be represented by the formula $-RCH=CH_2$, where R represents a single bond or an alkylene radical containing from 2 to 10 or more carbon atoms. The alkylene radical can be linear or branched. Examples of suitable alkenyl radicals include but are not limited to vinyl, 2-propenyl, 3-butenyl, 5-hexenyl, 7-octenyl and 10-undecenyl.

The organo groups of the polydiorganosiloxane are individually monovalent hydrocarbon radicals or substituted monovalent hydrocarbon radicals containing from 1 to 20 carbon atoms. The organo radicals can be identical or different, such as methyl or ethyl, substituted alkyl such as chloromethyl, 3-chloropropyl or 3,3,3-trifluoropropyl, cycloalkyl such as cyclohexyl, or aryl such as phenyl. A preferred radical is the methyl radical.

Generally the siloxane is polymerized to a viscosity of from 2 to 100 Pa.s at 25° C., preferably from 2 to 50 Pa.s. It is possible to use either higher or lower viscosity polymers.

A single polydiorganosiloxane can be used or a mixture of different polymers. Polydiorganosiloxane can include as a second polymer a liquid diorganoalkenylsiloxy-terminated polydiorganosiloxane that is represented by the average general formula

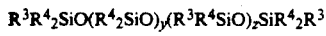

$$R^3R^4{}_2SiO(R^4{}_2SiO)_y(R^3R^4SiO)_zSiR^4{}_2R^3$$

In this formula $R^3$ represents a terminally unsaturated alkenyl radical containing at least four, preferably at least six, carbon atoms and $R^4$ is selected from the same group of monovalent hydrocarbon radicals and substituted monovalent hydrocarbon radicals as in the polydiorganosiloxane above. The preference for six carbon atoms for $R^3$ is based on the availability of the starting material, typically the corresponding chlorosilane, for preparing polydiorganosiloxanes containing this radical bonded to a portion of the silicon atoms. $R^3$ can be represented by the general formula —$R''CH=CH_2$, where $R''$ represents an alkylene radical containing at least 2 and preferably at least 4 carbon atoms. The radical represented by $R''$ can be linear or branched. Examples of $R^3$ include but are not limited to 5-hexenyl, 7-octenyl, 9-decenyl and 10-undecenyl. Methods for preparing the polydiorganosiloxanes are sufficiently disclosed in the patent and other literature such that a detailed description in this specification is not necessary.

The physical properties of the cured rubber are affected by the polymer size or viscosity used as well as the amount of crosslinking. For example, use of polymer mixtures having one polymer with only terminal vinyl groups and another polymer with both terminal vinyl groups and pendant vinyl groups on the chain is taught in U.S. Pat. No. 4,753,978, issued Jun. 28, 1988. In U.S. Pat. No. 4,946,878, issued Aug. 7, 1990, use of an alkenyl radical having at least 4 carbon atoms is taught, and also in U.S. Pat. No. 5,110,845, issued May 5, 1992. These patents are incorporated by reference to show polydiorganosiloxanes and their mixtures which can be used in this invention.

The crosslinking agent is an organohydrogensiloxane containing an average of more than two silicon-bonded hydrogen atoms per molecule. The organohydrogensiloxane contains from as few as four silicon atoms per molecule up to an average of 100 or more, and can have a viscosity of up to 10 Pa.s or higher at 25° C. The repeating units of this ingredient include but are not limited to $HSiO_{1.5}$, $R^1HSiO$ and/or $R^1{}_2HSiO_{0.5}$ in addition to one or more of $R^1SiO_{1.5}$, $R^1{}_2SiO$, $R^1{}_3SiO_{0.5}$, and $SiO_{4/2}$ units. In these formulas $R^1$ represents a monovalent hydrocarbon or halocarbon radical as defined above for R of the polydiorganosiloxane.

The organohydrogensiloxane can be a cyclic compound containing both diorganosiloxane and organohydrogensiloxane units or a compound of the formula $Si(OSiR^5{}_2H)_4$.

Proper curing of the present composition requires that the polydiorganosiloxane, organohydrogensiloxane and hydrosilation catalyst be miscible with one another. To ensure sufficient miscibility, it is preferred that a majority of the silicon-bonded hydrocarbon radicals that are present in the higher concentration in the polydiorganosiloxane and organohydrogensiloxane be selected from the same class, e.g. alkyl radical. In particularly preferred compositions, these hydrocarbon radicals are methyl or combinations of methyl with either 3,3,3,-trifluoropropyl or phenyl.

The molar ratio of silicon-bonded hydrogen atoms to vinyl or other ethylenically unsaturated hydrocarbon radicals in compositions curable by a hydrosilation reaction is important with respect to the properties of the cured elastomer. The optimum ratio for the present curable compositions will be determined at least in part by the molecular weight of the polydiorganosiloxane and the type of curing agent. An effective molar ratio of silicon-bonded hydrogen atoms to silicon-bonded alkenyl radicals is in the range of 1.2 to 1.9 with a preferred range of 1.4 to 1.65.

Hydrosilation reactions are typically conducted in the presence of a catalyst that is a metal from the platinum group of the periodic table or a compound of such a metal. Platinum is the preferred catalyst at this time. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593, issued Dec. 31, 1968.

The platinum-containing catalyst can be present in an amount equivalent to as little as one part by weight of platinum per one million parts by weight of curable composition. Catalyst concentrations equivalent to from 5 to 100 parts of platinum per million of curable composition are preferred to achieve a practical curing rate. Higher concentrations of platinum provide only marginal improvement in curing rate, and are therefore economically unattractive.

Mixtures of the aforementioned polydiorganosiloxane, crosslinking agent and platinum catalyst may begin to cure at ambient temperatures. To obtain a longer working time or "pot life", the activity of the catalyst under ambient conditions can be retarded or suppressed by addition of a suitable inhibitor. Known inhibitors include the acetylenic compounds disclosed in U.S. Pat. No. 3,445,420, issued May 20, 1969. Acetylenic alcohols such as 2-methyl-3-butyn-2-ol and ethynyl cyclohexanol constitute a preferred class of inhibitors that will suppress the activity of a platinum-containing catalyst at 25° C., but cure rapidly at temperatures of 70° C. or higher.

In order to obtain satisfactory levels of physical strength, compositions of polydiorganosiloxane are commonly reinforced with one or more fillers such as, for example, fumed silica. Any finely divided form of silicas can be used as a reinforcing filler. Colloidal silicas are preferred because of their relatively high surface area, which is typically at least 50 square meters per gram. Fillers having surface areas of at least 250 square meters per gram are preferred for use in the present method. Colloidal silicas can be prepared by precipitation or a fume process. Both of these preferred types of silica are commercially available.

The amount of finely divided silica used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

Typically, the reinforcing filler is modified with silica treating agents to prevent a phenomenon referred to as "creeping" or "crepe hardening" during processing of the curable composition. Preferably, a portion of the silica treating agent contains at least one silicon-bonded alkenyl radical per molecule. These silica treating agents are typically liquid hydroxyl terminated polydiorganosiloxanes containing an average of from 2 to about 20 repeating units and at least one alkenyl radical per molecule. They include, for example, organosilicon compounds such as hexaorganodisiloxanes and hexaorganodisilazanes that contain at least one alkenyl radical per molecule and hydrolyze under the conditions used to treat the silica to form compounds with silicon-bonded hydroxyl groups. Small amounts of water are often added to the composition during the filler treatment step to facilitate the process.

Preferably at least a portion of the silicon-bonded hydrocarbon radicals other than alkenyl that are present on the silica treating agent are identical to a majority of the hydrocarbon radicals present in the polydiorganosiloxane. The alkenyl radicals on the silica treating agent are preferably vinyl, particularly when alkenyl radicals containing at least four carbon atoms are present on the polydiorganosiloxane. It is believed that silica treating agents function by reacting with silicon-bonded hydroxyl groups present on the surface of the silica particles to reduce interaction between these particles and the polydiorganosiloxanes.

The filler can also be a non-reinforcing or extending filler of finely ground particles of oxides or hydroxides or carbonates of such as silicon, calcium, magnesium, barium, or zinc, with silicon oxide (quartz) and calcium carbonate as preferred non-reinforcing fillers. Suitable fillers for silicone elastomeric compositions are well known in the art.

To enhance the adhesion of the cured rubber to substrates, the silicone composition further contains an aluminum chelate and an epoxytrialkoxysilane. The combination of these two components in controlled amounts has been found important in providing sufficient adhesion without unacceptable increases in compression set. Compositions containing these two components have been found particularly useful for use with metal substrates.

Any aluminum chelate may be useful in the compositions which is compatible in the compositions and does not interfere with the hydrosilation cure. For example, aluminum may be chelated with 1,3-diketones such as acetylacetone and trifluoacetylacetone; hydroxycarboxylic acids such as tartric acid; synthetic macrocylic compounds including crown ethers such as 2,2,2-cryptate; and polymeric materials such as polymethylacryloylacetone. Aluminum acetylacetonate is a preferred aluminum chelate.

The aluminum chelate is typically used in an amount that provides from 0.05 to about 20 ppm by weight of aluminum based on the polydiorganosiloxane. It is usually preferred to employ the aluminum chelate to provide 0.1 to 2.0 ppm aluminum based of the polydiorganosiloxane.

The epoxytrialkoxysilane component is a trialkoxysilane functionalized with an organic substituent containing an epoxy group. Typically the alkoxy radicals of the epoxytrialkoxysilane may be the same or different and are usually selected from alkoxy radicals having 1 to 4 carbon atoms such that the alkoxy radicals are readily hydrolyzable upon contact with water. For example, the alkoxy radicals may include methoxy, ethoxy, propoxy, and butoxy. Epoxysilanes with other substituents which hydrolyze similarly to alkoxy substituents are expected to function satisfactorily in the compositions of this invention.

The trialkoxysilane is functionalized with an organic substituent containing an epoxy group. Generally the structure of the organic substituent bearing the epoxy group may vary widely. Commercially available useful epoxytrialkoxysilanes include 3-glycidoxypropyltrimethoxysilane and beta-(3,4-epoxycyclohexyl)ethyltrimethoxysilane. 3-glycidoxypropyltrimethoxysilane is preferred because of its ready availability and effectiveness.

The amount of epoxytrialkoxysilane used is typically 0.05 to 0.40 parts by weight per 100 parts by weight of polydiorganosiloxane in the composition. The adhesion of the cured rubber remains good with increased amounts, but the compression set increases such that the rubber often does not form an effective seal in gasketing applications. Preferred compositions contain 0.1 to 0.3 parts by weight of the epoxytrialkoxysilane.

When the compositions of this invention are intended to adhere to plastic materials, it has been found advantageous to include additional components including a tetraalkyltitanate, an alkylpolysilicate, and an acrylate or methacrylate compound in the composition. The tetraalkyltitanate is typically used in an amount that provides from 1 to about 100 ppm by weight of titanium based on the polydiorganosiloxane. It is usually preferred to employ the tetraalkyltitanate in an amount to provide 5 to 60 ppm titanium based on the polydiorganosiloxane. Typically the alkyl radicals of the tetraalkyltitanate may be the same or different and are selected from alkyl radicals having up to 20 carbon atoms. Useful tetraalkyltitanates include tetraisopropyltitanate, tetrabutyltitanate, and tetraoctyltitanate.

The alkylpolysilicate is partially hydrolyzed tetraalkyl silicate where the alkyl groups have up to about 4 carbon atoms. The alkyl groups may be the same or different. Useful alkylpolysilicates include, for example, ethylpolysilicate and butylpolysilicate. Alkylpolysilicate is typically used at 0.1 to 10 parts by weight per 100 parts by weight of polydiorganosiloxane. It is preferred for improved adhesion to plastic substrates to include from 0.2 to 1.5 parts of ethylpolysilicate.

A compatible acrylate or methacrylate compound is also employed with the above components to obtain adhesion to plastics while retaining low compression set. Compatible acrylate and methacrylate compounds may be selected from the alkyl, alkenyl, and aryl esters of acrylic or methacrylic acid. The alkyl and alkenyl groups typically contain up to 10 carbon atoms and the aryl groups typically contain from 6 to 10 carbon atoms in the esters. For example, the alkyl groups may be methyl, ethyl, butyl, and octyl; the alkenyl groups may be vinyl, allyl, and butenyl; and the aryl groups may be phenyl or naphtyl. The acrylate or methacrylate compound is typically used at 0.1 to 2.0 parts by weight per 100 parts by weight of polydiorganosiloxane with 0.2 to 1.2 parts being more preferred.

In addition to the above ingredients, the composition can include the conventional additives which are included to impart or enhance certain properties of the cured elastomer or facilitate processing of the curable composition. Typical additives include, but are not limited to, pigments, dyes, and heat and/or ultraviolet light stabilizers. The effect of any such additives should be evaluated as to their result and impact on other properties of the composition.

The compositions of this invention can be prepared by a simple mixing of the ingredients. However, when reinforcing fillers are included, the fillers are often treated in situ by first combining the polydiorganosiloxane, filler, filler treating agents and enough water to facilitate the filler treating process and then heating the mixture. For example, heating for 1 to 4 hours at about 170° C. has been found to provide good filler treatment. The heating may also be conducted at reduced pressure to assist in removing any excess water and the ammonia formed in the process. After filler treatment is completed the remaining components are simply mixed into the composition. The equipment needed for the mixing depends upon the viscosity of the polydiorganosiloxane used and the amount of filler.

When all of the ingredients are mixed together, the composition will begin to cure unless a cure inhibitor is present. If the composition is not to be used immediately after mixing, it should be prepared in at least two parts. If the organohydrogensiloxane is placed in one part and the platinum catalyst is placed in another part, the individual parts will be shelf stable. The amounts of polydiorganosiloxane, organohydrogensiloxane and filler that are placed in each part can be varied to obtain the desired result. A convenient system distributes the ingredients into two parts so that the polydiorganosiloxane and filler are divided equally between the two parts. The organohydrogensiloxane is added to one part and the platinum catalyst is added to the other part. This results in a two-part system where the two part are mixed together in equal amounts and the consistency of the two parts is about the same so that they can be easily mixed at the time of use. Other proportions of the ingredients can of course be used, as well as more than two parts if desired.

For application, the two parts of the composition are mixed together and extruded into place on the substrate as a bead to form a gasket. After the gasket is formed on the substrate, it may be allowed to cure at ambient temperatures or it may be heated to accelerate the cure. The gasket adheres to the substrate upon cure. The substrate, with the cured gasket adhered in place, is then installed, or placed into storage until needed.

The following examples are included for illustrative purposes only and should not be construed as limiting the invention which is properly set forth in the appended claims. Parts are parts by weight.

EXAMPLE 1

Two-part materials were prepared for use in evaluating various proportions of adhesion additives. Each part was prepared with the same ingredients except for the curing system and the adhesion additive package which was added to the mixtures of part A and part B.

Part A was prepared by mixing 100 parts of dimethylvinylsiloxy endblocked polydimethylsiloxane having a viscosity of about 55 Pa.s at 25° C., 0.25 part of tetramethyldivinyldisilazane, 6 parts of hexamethyldisilazane, 3 parts of hydroxyl endblocked polydimethylsiloxane fluid having a viscosity of about 0.04 Pa.s at 25° C. and about 4 weight percent silicon-bonded hydroxyl radicals, 25 parts of ground quartz having an average particle diameter of about 5 micrometers, 25 parts of fumed silica having a surface area of about 400 m$^2$/g, and 1.3 part water and heating the mixture for 2 to 4 hours at 170° C. under vacuum. After cooling, 0.33 part of platinum catalyst, 4 parts of calcium hydroxide, 1.5 parts of black pigment, 0.063 part of tetrabutyltitanate (TBT), and 0.033 part of a 5 percent by weight solution of aluminum acetylacetonate (AlAcAc) in toluene were mixed into the composition. The platinum catalyst employed was a reaction product of hexachloroplatinic acid and sym-tetramethyldivinyldisiloxane that was diluted with a liquid dimethylvinylsiloxy terminated polydimethylsiloxane in an amount to achieve a platinum content of 0.7 weight percent. The 0.033 part of 5 percent by weight solution of AlAcAc provides 1.4 ppm aluminum based on polydimethylsiloxane in Part A. Mixing equal amounts of Part A and Part B as described below gives 0.7 ppm aluminum in the final composition. The 0.063 part of TBT provides 89 ppm titanium based on polydimethylsiloxane in Part A. Mixing equal amounts of Part A and Part B as described below gives 44 ppm titanium in the final composition.

Part B was prepared by mixing 100 parts of dimethylvinylsiloxy endblocked polydimethylsiloxane having a viscosity of about 55 Pa.s at 25° C., 0.25 part of tetramethyldivinyldisilazane, 6 parts of hexamethyldisilazane, 3 parts of hydroxyl endblocked polydimethylsiloxane fluid having a viscosity of about 0.04 Pa.s at 25° C. and about 4 weight percent silicon-bonded hydroxyl radicals, 25 parts of ground quartz having an average particle diameter of about 5 micrometers, 25 parts of fumed silica having a surface area of about 400 m$^2$/g, and 1.3 part water and heating the mixture for 2 to 4 hours at 170° C. under vacuum. After cooling, 2.06 parts of methyl methacrylate, 0.1 part of ethynylcyclohexanol, 1.7 part of dimethylhydrogensiloxy-SiO$_2$ copolymer having about 1 weight percent hydrogen and a viscosity of about 24 centistokes, and an amount of ethylpolysilicate (EPS) and glycidoxypropyltrimethoxysilane (GPS) in a 4 to 1 ratio by weight.

A series of compositions was prepared by mixing the above part A and part B in a 1 to 1 ratio by weight to determine the adhesion to nylon and polyester substrates and the compression set as the concentration of the EPS and GPS was increased. Their combined concentration was varied from 1.7 part to 0.33 part per 100 parts of polydimethylsiloxane. These mixtures had an SiH to SiVi ratio of 1.5. The composition with no EPS and GPS was made as described above, but without the tetrabutyltitanate or aluminum acetylacetonate.

The adhesion samples were prepared by applying beads of the composition to panels of the material to be bonded to and curing for 10 minutes at 150° C. in an air-circulating oven. After allowing to cool and age at least 8 hours, the beads were pulled from the panel by hand at a 90 degree angle and the amount of adhesion was judged by the difficulty of removal and the appearance of the panel after the bead had been pulled off. A scale of 1 to 10 was used with the definitions of 0=no adhesion
5=borderline adhesion
6=cohesive adhesion begins
8=about half of surface shows cohesive failure
10=total surface shows cohesive failure The compression set samples were prepared by molding the composition in a press into a sheet having a thickness of about 1.9 mm (0.075 inch) and curing for 5 minutes at 150° C. The cured sheet was cut into test samples and tested for compression set in accordance with ASTM D 395, compressing for 22 hours at 177° C.

The results of these tests are shown in Table I.

TABLE I

| Parts | Adhesion to | | Compression Set |
|---|---|---|---|
| (EPS + GPS) | nylon | polyester | 22 hr/177° C. |
| 1.7 | 10 | 10 | 52 |

TABLE I-continued

| Parts | Adhesion to | | Compression Set |
|---|---|---|---|
| (EPS + GPS) | nylon | polyester | 22 hr/177° C. |
| 0.84 | 8 | 10 | 36 |
| 0.58 | 6 | 5 | 41 |
| 0.42 | 6 | 6 | 31 |
| 0.33 | 2 | 5 | 28 |
| 0.00 | 0 | 0 | 22 |

As the amount of EPS and GPS is increased, the adhesion to nylon and polyester increases, but the compression set also increases.

EXAMPLE 2

A series of samples was prepared to determine how the level of methylmethacrylate (MMA) influenced adhesion to nylon, polyester, and cast aluminum. Cure times as measured by a Monsanto Moving Die Rheometer were also run to determine the effect of the MMA upon cure rate.

The composition was the same as in Example 1, except all parts A contained 0.063 part TBT, and 0.033 part of the AlAcAc solution, and all parts B contained 0.68 part EPS and 0.17 part GPS. Results are shown in Table II.

TABLE II

| part MMA | Cure Times (sec.) | | Adhesion to | | | Compression Set |
|---|---|---|---|---|---|---|
| | T2 | T90 | Nylon | Polyester | Al | 22 hr/177° C. |
| 1.5 | 17 | 105 | 6 | 8 | 9 | 42 |
| 1.0 | 9 | 48 | 6 | 5 | 8 | 31 |
| 0.50 | 9 | 27 | 6 | 5 | 4 | 30 |
| 0.00 | 3 | 23 | 2 | 0 | 0 | 20 |

As the amount of methylmethacrylate was increased, the adhesion to nylon and polyester increased, but the compression set also increased.

EXAMPLE 3

A series of samples were prepared to determine the need and effect of including both tetrabutyltitanate and aluminum acetylacetonate in the composition.

Compositions were prepared as in Example 1, but using 1.8 parts instead of 1.7 parts of the dimethylhydrogensiloxy-SiO2 copolymer to give an SiH/SiVi ratio of 1.6. Parts A had the amounts of TBT and AlAcAc solution shown in Table III and parts B had 0.68 part EPS and 0.17 part GPS.

TABLE III

| TBT parts | AlAcAc parts | Adhesion to | | | Compression Set |
|---|---|---|---|---|---|
| | | Nylon | Polyester | Al | 22 hr/177° C. |
| 0.033 | 0.0 | 6 | 5 | 9 | 34 |
| 0.0 | 0.017 | 2 | 2 | 6 | 26 |
| 0.033 | 0.017 | 6 | 5 | 8 | 31 |

The results in Table III show that when just TBT was added, good adhesion was obtained, but compression set was high. When just AlAcAc was used, poor adhesion was obtained, but good compression set was achieved. When both were added, the result was that acceptable adhesion and compression set were both achieved.

EXAMPLE 4

A series of samples were prepared to determine if both ethylpolysilicate and glycidoxypropyltrimethoxysilane are required for optimum adhesion and compression set.

Part A was prepared as in Example 1, but the TBT was at the 0.063 part level. AlAcAc solution additions were adjusted to give the total amounts as shown in Table IV. Part B was as in Example 1, but the amount of EPS and GPS were adjusted to give the total amounts and ratios shown for the final composition in Table IV.

TABLE IV

| EPS/GPS ratio | parts | AlAcAc parts | Adhesion to | | Compression Set |
|---|---|---|---|---|---|
| | | | Nylon | Polyester | 22 hr/177° C. |
| 5:0 | 0.50 | 0.0 | 2 | 0 | 28 |
| 4:1 | 0.42 | 0.017 | 6 | 6 | 31 |
| 2:3 | 0.42 | 0.017 | 10 | 5 | 40 |
| 0:5 | 0.42 | 0.017 | 0 | 4 | 50 |

When either EPS or GPS was not present in the formulation, the adhesion was lost.

EXAMPLE 5

Different two-part materials were prepared for use in evaluating various proportions of adhesion additives for adhesion to metals, such as aluminum. The two parts were prepared with the same ingredients, other than the curing system and the adhesion additives.

Part A was prepared by mixing 93 parts of dimethylvinylsiloxy endblocked polydimethylsiloxane having a viscosity of about 55 Pa.s at 25° C., 7 parts of dimethylhexenyl terminated polydimethylmethylhexenylsiloxane having about 1 percent hexenyl radicals and a viscosity of about 0.4 Pa.s at 25° C., 0.25 part of tetramethyldivinyldisilazane, 7 parts of hexamethyldisilazane, 1 part of hydroxyl endblocked polydimethylsiloxane fluid having a viscosity of about 0.04 Pa.s at 25° C. and about 4 weight percent silicon-bonded hydroxyl radicals, 20 parts of ground quartz having an average particle size of about 5 micrometers, 35 parts of fumed silica having a surface area of about 400 m2/g, and 1.5 part of water and heating the mixture for 2 to 4 hours at 170° C. under vacuum. After cooling, 0.33 part of platinum catalyst of Example 1, 4 parts of calcium hydroxide, and 0.032 part of the 5 percent by weight of AlAcAc in toluene solution were added to the mixture.

Part B was prepared by mixing 93 parts of dimethylvinylsiloxy endblocked polydimethylsiloxane having a viscosity of about 55 Pa.s at 25° C., 7 parts of dimethylhexenyl terminated polydimethylmethylhexenylsiloxane having about 1 percent hexenyl radicals and a viscosity of about 0.4 Pa.s at 25° C., 0.25 part of tetramethyldivinyldisilazane, 7 parts of hexamethyldisilazane, 1 part of hydroxyl endblocked polydimethylsiloxane fluid having a viscosity of about 0.04 Pa.s at 25° C. and about 4 weight percent silicon-bonded hydroxyl radicals, 20 parts of ground quartz having an average particle size of about 5 micrometers, 35 parts of fumed silica having a surface area of about 400 m2/g, and 1.5 part of water and heating the mixture for 2 to 4 hours at 170° C. under vacuum. After cooling, 3.5 parts of dimethylsiloxymethylhydrogensiloxy copolymer having about 0.8 weight percent hydrogen and a viscosity of about 0.016 Pa.s, and 0.1 part of ethynylcyclohexanol were added to the mixture.

A series of compositions were prepared with different amounts of AlAcAc and GPS to evaluate for adhesion to cast aluminum and for compression set. This series mixed 50 parts of part A and 50 parts of part B as described above with the weight percent based on the combined weight of polydimethylsiloxane and polydimethylmethylhexenylsiloxane of GPS (3-glycidoxypropyltrimethoxysilane) and AlAcAc (aluminum acetylacetonate) shown below in Table V. This mixture gave an SiH to SiVi ratio of 1.65. These compositions were then tested for adhesion to aluminum and for compression set as in Example 1. The results of these tests are shown in Table V.

TABLE V

| Weight percent | | Adhesion on | Compression Set |
|---|---|---|---|
| GPS | AlAcAc | Cast Al. | 22 hr/177° C. |
| 1.7 | 0.017 | 10 | 54 |
| 0.84 | 0.017 | 10 | 52 |
| 0.58 | 0.017 | 10 | 38 |
| 0.42 | 0.017 | 9 | 44 |
| 0.25 | 0.017 | 6 | 29 |
| 0.17 | 0.017 | 10 | 26 |
| 0.00 | 0.00 | 0 | 19 |

EXAMPLE 6

A series of samples was prepared in which the SiH to SiVi ratio was varied and then tested for adhesion to cast aluminum and compression set. In these tests the amount of GPS was held constant at 0.25 part and the amount of AlAcAc was held constant at 0.017 part, both per 100 parts of base mixture. The SiH/SiVi ratio was adjusted by using the amount of the dimethylhydrogensiloxy-SiO2 copolymer shown in Table VI in making part B. The results are shown in Table VI.

TABLE VI

| Copolymer parts | SiH/SiVi | Adhesion to Cast Al. | Compression Set 22 hr/177° C. |
|---|---|---|---|
| 1.47 | 1.30 | 10 | 22 |
| 1.59 | 1.40 | 10 | 21 |
| 1.64 | 1.45 | 10 | 20 |
| 1.76 | 1.55 | 7 | 23 |
| 1.82 | 1.65 | 6 | 29 |
| 1.86 | 1.75 | 4 | 34 |
| 2.1 | 1.85 | 5 | 35 |
| 1.82* | 1.65 | 0 | 19 |

*sample without GPS or AlAcAc

EXAMPLE 7

A series of samples was prepared in which either the amount of GPS was varied or the amount of dimethylhydrogensiloxy-SiO2 copolymer was varied. Finally, the level of tetrabutyltitanate (TBT) was varied to determine the effect upon adhesion and compression set. The amount of aluminum acetylacetonate solution was held constant at 0.017 part. The results are shown in Table VII.

TABLE VII

| SiH/SiVi | Amount | | Adhesion | Compression Set |
| | GPS | TBT | Cast Al | 22 hr/177° C. |
|---|---|---|---|---|
| 1.55 | 0.25 | 0.0 | 9 | 21 |
| 1.55 | 0.25 | 0.033 | 10 | 32 |
| 1.55 | 0.33 | 0.0 | 9 | 26 |
| 1.55 | 0.33 | 0.033 | 10 | 30 |
| 1.4 | 0.25 | 0.00 | 10 | 21 |
| 1.4 | 0.25 | 0.033 | 10 | 28 |

These results show that TBT is not required for adhesion to aluminum and is detrimental to compression set.
That which is claimed is:

1. A liquid silicone composition curable to a rubber, the composition comprising:
    an alkenyl-containing polydiorganosiloxane having an average ratio of organo radicals per silicon atom within a range greater than 2 up to and including 2.03, and each organo radical of the polydiorganosiloxane being a monovalent radical selected from the group consisting of hydrocarbon radicals and fluorinated alkyl radicals both having less than 7 carbon atoms per radical,
    an organohydrogensiloxane having an average of at least 3 silicon-bonded hydrogen atoms per molecule and valences of any silicon atom in the organohydrogensiloxane not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organohydrogensiloxane having no more than one silicon-bonded hydrogen atom on any one silicon atom, the amount of organohydrogensiloxane providing a ratio of silicon-bonded hydrogen atoms to alkenyl groups from the polydiorganosiloxane of 1.2 to 1.9,
    a hydrosilation catalyst containing a metal of the platinum-group,
    an aluminum chelate in an amount to provide 0.05 to 20 ppm aluminum based on the polydiorganosiloxane, and
    0.05 to 0.40 parts epoxytrialkoxysilane per 100 parts polydiorganosiloxane where the alkoxy radicals of the epoxytrialkoxysilane have 1 to 4 carbon atoms.

2. The liquid silicone composition of claim 1 further comprising a particulate filler.

3. The liquid silicone composition of claim 2 wherein the aluminum chelate comprises aluminum chelated with a 1,3-diketone and the epoxytrialkoxysilane is selected from the group consisting of 3-glycidoxypropyltrialkoxysilanes and beta-(3,4-epoxycyclohexyl)ethyltrialkoxysilane.

4. The liquid silicone composition of claim 3 wherein the aluminum chelate is aluminum acetylacetonate in an amount to provide 0.10 to 2.0 ppm aluminum based on the polydiorganosiloxane.

5. The liquid silicone composition of claim 4 where the epoxytrialkoxysilane is 3-glycidoxypropryltrimethoxysilane.

6. The liquid silicone composition of claim 5 containing 0.10 to 0.30 parts 3-glycidoxypropryltrimethoxysilane per 100 parts polydiorganosiloxane.

7. The liquid silicone composition of claim 1 further comprising a tetraalkyltitanate in an amount to provide 1 to 100 ppm titanium based on the polydiorganosiloxane where the alkyl radicals of the tetraalkyltitanate have 1 to 20 carbon atoms,
    from 0.1 to 10 parts alkylpolysilicate per 100 parts polydiorganosiloxane where the alkyl radicals of the alkoxypolysilicate have 1 to 4 carbon atoms, and
    from 0.1 to 2.0 parts of an acrylate or methacrylate compound per 100 parts polydiorganosiloxane.

8. The liquid silicone composition of claim 7 further comprising a particulate filler.

9. The liquid silicone composition of claim 8 wherein the aluminum chelate comprises aluminum chelated with a 1,3-diketone, the epoxytrialkoxysilane is selected from the group consisting of 3-glycidoxypropyltrialkoxysilanes and beta-(3,4-epoxycyclohexyl)ethyltrialkoxysilane, and the acrylate and methacrylate compounds are selected from alkyl, alkenyl and aryl esters of acrylate and methacrylate where the alkyl and alkenyl groups have from 1 to 10 carbon atoms and the aryl groups have from 6 to 10 carbon atoms.

10. The liquid silicone composition of claim 9 wherein the aluminum chelate is aluminum acetylacetonate in an amount to provide 0.10 to 2.0 ppm aluminum based on the polydiorganosiloxane and the tetraalkyltitanate is tetrabutyltitanate in an amount to provide 5 to 60 ppm titanium based on the polydiorganosiloxane.

11. The liquid silicone composition of claim 10 where the epoxytrialkoxysilane is 3-glycidoxypropryltrimethoxysilane and the alkoxypolysilicate is ethylpolysilicate in an amount of 0.2 to 1.5 parts per 100 parts polydiorganosiloxane.

12. The liquid silicone composition of claim 11 containing 0.10 to 0.30 parts 3-glycidoxypropryltrimethoxysilane per 100 parts polydiorganosiloxane and where the acrylate or methacrylate compound is methyl acrylate or methylmethacrylate in an amount of 0.2 to 1.2 parts per 100 parts polydiorganosiloxane.

13. The rubber composition formed by curing the liquid silicone composition of claim 1.

14. The rubber composition formed by curing the liquid silicone composition of claim 1 where the rubber exhibits a compression set of 35 percent or less after testing at 177° C. for 22 hours.

15. The rubber composition formed by curing the liquid silicone composition of claim 6 where the rubber exhibits a compression set of 35 percent or less after testing at 177° C. for 22 hours.

16. The rubber composition formed by curing the liquid silicone composition of claim 7 where the rubber exhibits a compression set of 35 percent or less after testing at 177° C. for 22 hours.

17. The rubber composition formed by curing the liquid silicone composition of claim 12 where the rubber exhibits a compression set of 35 percent or less after testing at 177° C. for 22 hours.

18. The rubber composition formed by curing the liquid silicone composition of claim 1 where the rubber exhibits a compression set of 28 percent or less after testing at 177° C. for 22 hours.

19. The rubber composition formed by curing the liquid silicone composition of claim 7 where the rubber exhibits a compression set of 28 percent or less after testing at 177° C. for 22 hours.

20. The liquid silicone composition of claim 1 prepared in two parts with the organohydrogensiloxane placed in one part and the hydrosilation catalyst placed in the other part.

* * * * *